H. Z. FELDE.
Process for Preparing Yeast.

No. 217,521.                     Patented July 15, 1879.

Figure 2:
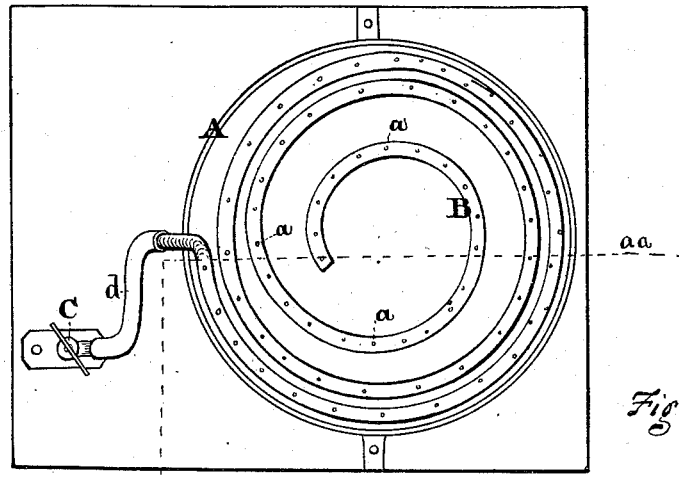

(Vert. sec. on line "aa" fig. 2.)

Witness
Alex. Ratsford
Clarence Woodford

Inventor,
Henry zum Felde,
by E. Thurlow, his atty.

UNITED STATES PATENT OFFICE.

HENRY ZUM FELDE, OF CANTON, ILLINOIS.

IMPROVEMENT IN PROCESSES FOR PREPARING YEAST.

Specification forming part of Letters Patent No. 217,521, dated July 15, 1879; application filed May 6, 1879.

*To all whom it may concern:*

Be it known that I, HENRY ZUM FELDE, of the city of Canton, in the county of Fulton, in the State of Illinois, have invented an Improvement in the Making of Yeast, and causing the same to rise, for collection, to the surface of the mash; and do hereby declare that the following is a full, clear, and exact description thereof, reference being had to the annexed drawings, making a part of this specification, in which like letters of reference refer to like parts, and in which—

Figure 1:
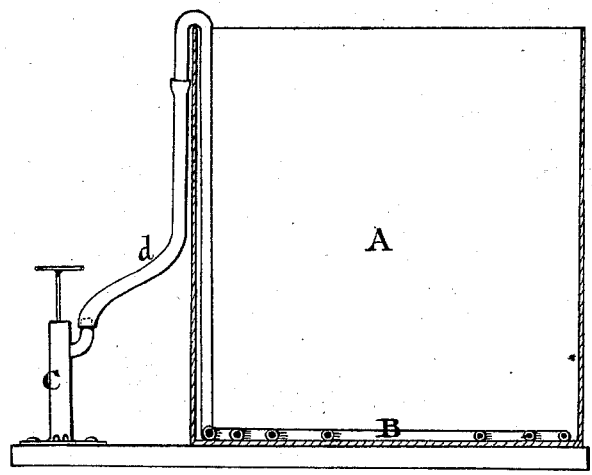

Figure 1 represents a vertical sectional elevation of the injector and mash or fermenting vessel; Fig. 2, a plan of the same.

My invention relates to both the increased quantity and quality of the yeast, as well as the forcing of the yeast to the surface. To do this I inject air or combination of air or gas or vapor, in quantities found most nourishing, to the yeast-plant into the lower strata of the fermenting-vessel in such a manner that many currents of such air, &c., rising through the yeast carries before it the yeast-plants upward to the surface of the mash, and so facilitate the collection of the yeast more quickly than by the old process or natural rise of the same to the surface, in conjunction with a greatly-increased growth or quantity of the yeast-plant consequent upon the so introduced air or gas or vapor.

The ingredients or formula for starting the fermentation or mash is in no way material to the success of the process, as the process is equally applicable to any kind of yeast-fermentation.

As above stated, I employ any gas, vapor, or common air, or mixture of either or all of them, which may be most nourishing to the yeast, and at the same time light enough to carry the yeast so produced to the surface of the ferment or mash, thereby enabling the whole of the yeast produced at one fermentation to be thoroughly collected at the surface of the mash, and not left below the surface of the same to be wasted.

The advantages of this process have been already developed by the above description; but the increase of quantity and quality of the yeast thus produced over the old process of production is six pounds to two pounds produced by the latter mode with the same quantity of ingredients, for in the old process the yeast is carried up very slowly, and only to a certain extent, merely by the evolution of carbonic-acid gas.

In the drawings, which represent one of the modes in which I introduce air, vapor, or gas, as described, into a fermenting-vessel, A represents the yeast vessel or fermenter; B, a coiled pipe large enough to introduce a requisite quantity of such air, gas, &c., which may be made to escape in small currents from the pipe (throughout its length within the vessel A) by means of perforations $a$ $a$, seconded by force of an air-pump, C, or other pressure.

A flexible pipe, $d$, may be used as a part of the connections, to facilitate the removal of the coil or injector from one mash-vessel to another.

I am aware that similar means have been used in brewing, oxidizing, aerating, or odorating of spirits, and aerating milk or cream in churning; therefore I do not claim, broadly, the use of the same; but What I do claim, and desire to secure by Letters Patent, is—

The process of preparing and making yeast and promoting the growth and increase of the same, and also facilitating the collection thereof, consisting in the introduction of minute upward currents of air, gas, or vapor of a suitable temperature into the mash, near the bottom thereof, thus floating or driving the same to the surface, substantially as described.

In testimony that I claim the foregoing process of making and collecting yeast I have hereunto set my hand this 2d day of May, A. D. 1879.

HENRY ZUM FELDE.

Witnesses:
ORRIN P. BISSELL,
JAMES M. MOORE.